JAMES BALLARD KILLION

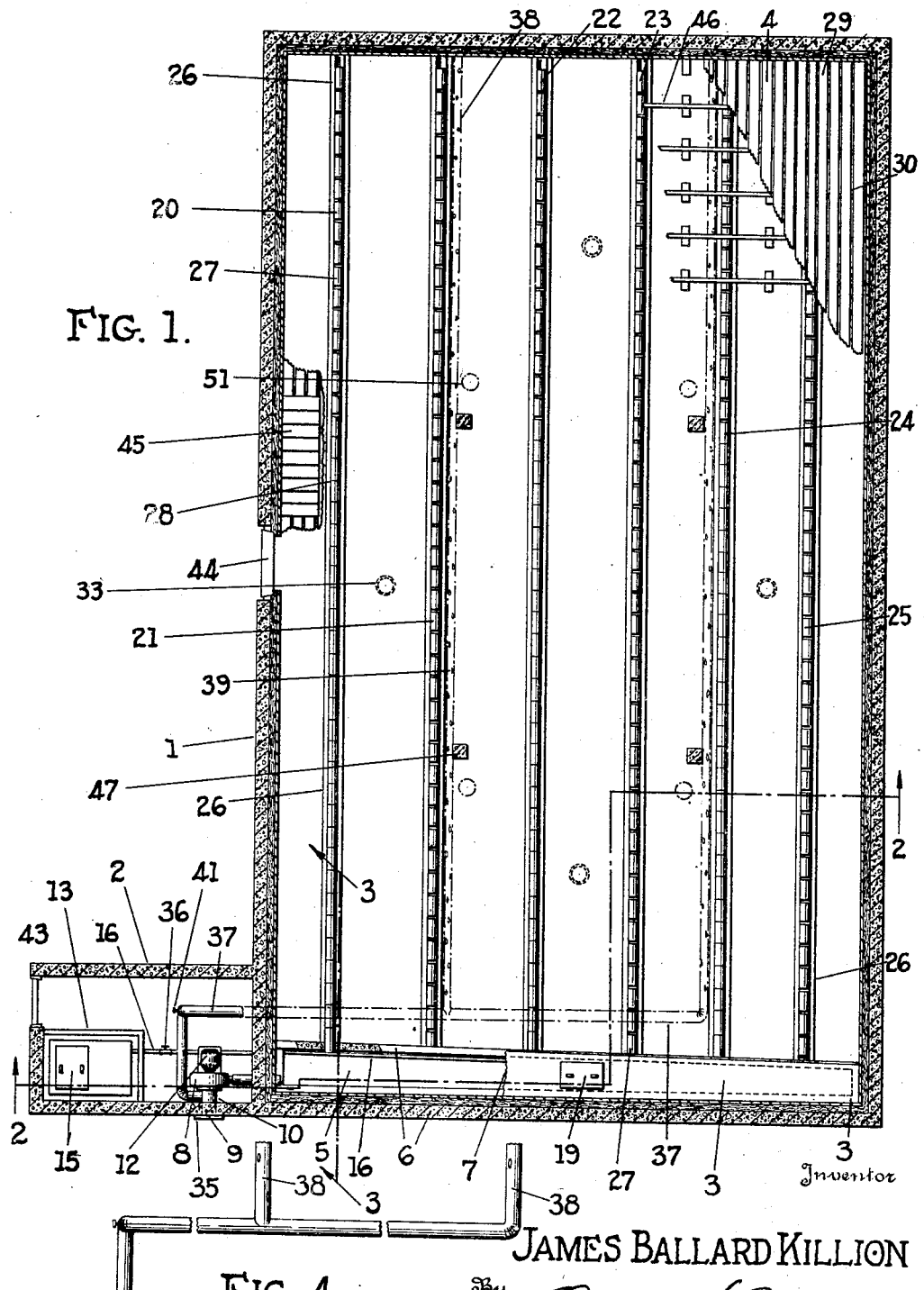

Patented Feb. 18, 1930

1,747,304

UNITED STATES PATENT OFFICE

JAMES BALLARD KILLION, OF PLAINVILLE, INDIANA

STORAGE PLANT TO PRESERVE BY NATURAL AND ARTIFICIAL MEANS

Application filed June 26, 1928. Serial No. 288,385.

This invention pertains to storage means for fruits, vegetables and other commodities, and serves to keep the contents in a dormant and physically unchanged state thus preventing the shrinking, sprouting, overripening or decay of fruit or vegetables and consists substantially in construction, combination and arrangement of apparatus and structure hereinafter set forth and pointed out more particularly in the claims.

It is an object of the invention to provide a means which serves to retain the natural and tender qualities of fruit or vegetable thus stored.

A feature of the invention is the provision of means to preserve by maintaining certain natural conditions, and to assist same as and when desired by artificial means.

It is a further feature of the invention to provide a storage regulatable as to temperature and humidity, for keeping same within a suitable range to prevent deterioration from either too cold, or too warm as well as too dry or too moist an atmosphere.

These and other characteristics are obtained by the structure and apparatus illustrated in the accompanying drawing which is somewhat diagrammatic. Figure 1 is a fragmentary sectional plan view of the invention.

Figure 4 is a fragmentary view of the air return conduits.

Figure 3:
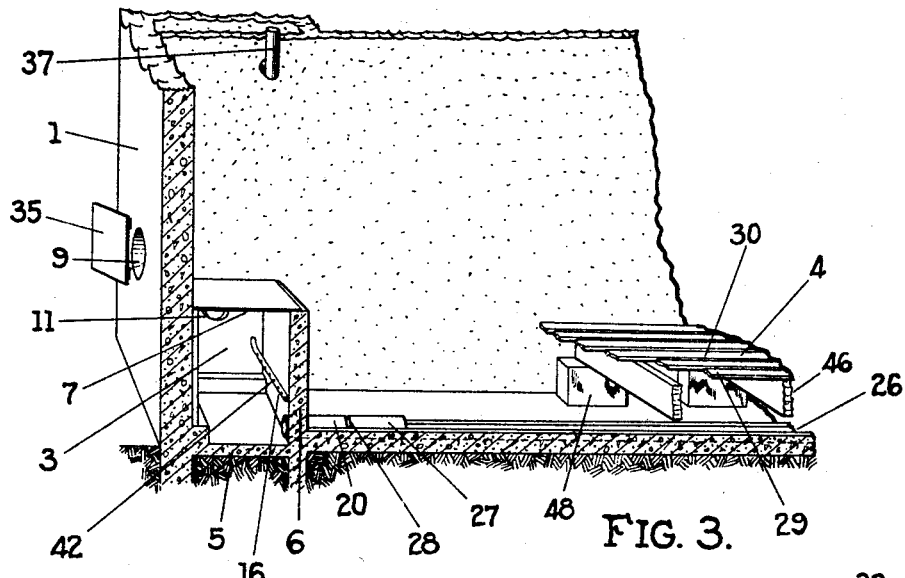
Figure 3 is a fragmentary perspective view of the main air and water introducing portion of the main structure, as taken in the proximity of lines 3—3, Figure 1 with parts removed.

Referring to the different views, like numerals designate corresponding parts throughout. The numeral 1 designates the main building structure and in this instance the numeral 2 designates an auxiliary room built on to one corner of the main structure.

Across one end of the main structure, adjacent said auxiliary room is an interior air-shaft 3 which extends below and above the floor 4. The floor 5 and side walls 6 of said air-shaft are constructed of substantially water tight material, preferably cement. The outer one of said side walls is conveniently constructed in common with the adjacent wall of the main structure. The upper wall 7 of said air-shaft is constructed in an airtight manner and is conveniently made of galvanized iron.

An air blower 8 is disposed within the auxiliary room 2 and serves to pull air from the exterior from an opening 9 in one of the walls of the said auxiliary room through the conduit 10, and discharge same through an opening 11 of the adjacent wall of the main structure, said opening 11 communicating with the adjacent end of the air-shaft 3. In this instance the blower is driven by an electrical motor 12 which is fed from a usual electrical current source (not shown), although other driving means may be substituted.

A refrigerator type ice box 13 is provided in the auxiliary room 2 in which ice 14 is placed through the conventional ice box door 15. As the ice melts in said ice box, the water therefrom runs by way of the pipe 16 through a hole in the adjacent wall of the main structure, into the air-shaft 3. This water accumulates in said air-shaft and other water or ice may be supplied as required through an air tight door 19 in the upper wall 7 of said air-shaft.

Communicating with said air-shaft are strands of tile 20, 21, 22, 23, 24 and 25, which convey and distribute water from said air shaft along under the floor 4. Said tile strands are laid in water tight troughs 26 which semi-circle same. Said troughs are constructed of cement in this example of the invention.

By this arrangement it will be understood that water 18 which is supplied to the air shaft 3 runs out through the different tile strands and overflows between the tile pieces 27 and thence over the edges of the troughs 26. It will also be understood that by this arrangement an air space is left within the upper portions of said tile strands through which the air from the blower 8 which discharges into the air-shaft 3, and is thus distributed under the floor 4, through said tile strands.

In order to more thoroughly distribute the air under said floor, air tight closures 28 preferably formed of cement is provided between the tile pieces, throughout intermittent stretches of the tile strands so that they are thus made substantially air tight at some portions, by which arrangement the blower 8 is used to force a more even distribution of air under the floor 4. By employing strands of tile for carrying the air and water to various parts of the main structure 1, the tile may be spread apart at their meeting ends to obtain a greater amount of air at any specified point in the length of the strands of tile, or placed closer together at certain points to reduce the amount of air. This is very advantageous, as when a certain vegetable or fruit requiring a greater or less amount of air than is required for the remainder of the vegetables or fruit, is placed at a certain point in the main structure.

Figure 2:
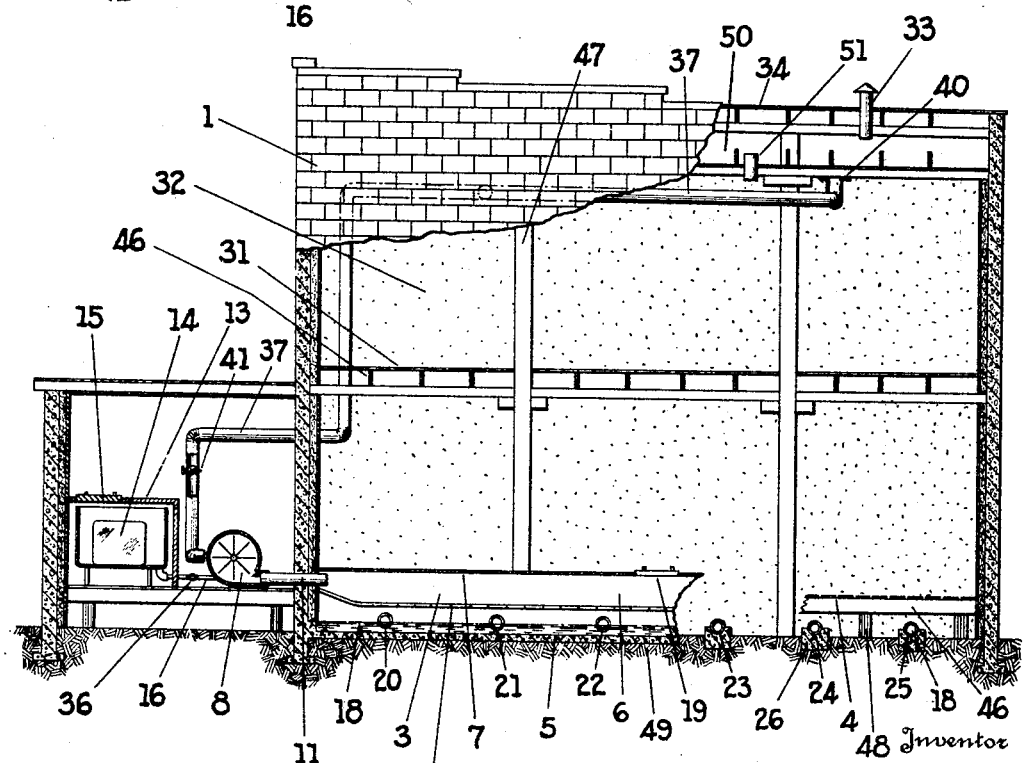
Figure 2 is a fragmentary cross sectional view of Figure 1 taken in the proximity of line 2—2.

The floor 4 is constructed of heavy slats 29 leaving cracks 30 of sufficient size to give passage to the air thus discharged from said tile strands and the second floor 31 of the storage is likewise constructed of heavy slats suitably spaced apart to allow air to pass between same into the upper story 32. Vertical ducts 33 with rain proof coverings are distributively arranged through the roof structure 34, as shown in Figure 2 and indicated by the dotted lines 33 in Figure 1, by which arrangement air introduced through the tile strands is allowed to escape and thus be evenly attracted through the storage.

The fruits, vegetables and other products to be stored are stacked on the floors 4 and 31 in slatted crates (not shown) or the equivalent, and it will be understood that air is thus evenly circulated through and about same.

During the normal operation of the apparatus, air from the blower 8, in passing over the water 18 in the air-shaft 3, is cooled and loaded with the proper humidity by evaporation of same which is more thoroughly effected by being then blown out over the water in the troughs 26 through the tile strands. In addition to the cooling effect of the water by vaporization, the atmosphere within the storage is given the proper degree of humidity to prevent drying out of the fruit, vegetables or other products within the storage.

The intake opening 9 for the blower 8 is provided with a door means 35 and under some conditions as for example at night in cool weather it may be desirable to leave said blower idle thus allowing air to be pulled through same by the natural draft action of the vertical ducts 33 and of the main storage structure as a whole. Under these and other conditions it might be more suitable to dispense with the use of ice and to only supply the air shaft 3 with water through the door 19 or through the refrigerator 13 as desired.

A valve 36 is provided as a part of the pipe 16 which drains the water from said ice box to said air-shaft, by which arrangement said ice box may serve simply as a water storage, and the operator may admit water to the air-shaft through the valve 36 as required.

Communicating with the intake duct 10 is a return intake duct 37 which enters the main storage structure and communicates in this particular example with two or more branch conduits 38 which have perforations 39. Said conduits and perforations are indicated by dot-and-dash lines in Figure 2. Said dually arranged conduits are positioned in the extreme upper portion of the storage structure and are conveniently supported to the second story ceiling by hangers 40. The conduit 37 embodies a damper 41 which may be entirely or partly opened, when bringing said conduit into use, the inlet door 35 being partially or entirely closed, by which arrangement said fan is entirely or partly fed by air thus returned to same from the conduits 38, more particularly in extreme hot or cold weather.

It will be understood that when the door 35 is entirely closed and the damper 41 is open that the air within the storage is blown into the air-shaft 3 through the tile strands from which it arises to the conduits 38 and is thus used over and over again as desired. By thus repeatedly bringing the air in contact with the ice in the air shaft 3 and water, it may be re-cooled as many times as desired and the air having been once well laden with moisture in the first instance will absorb very little water thereafter. Less water will be used in evaporation and the supply thereof will be efficiently conserved.

The water pipe 16 extends substantially throughout the full length of the air shaft 3 and contains perforations 42 through which the water trinkles distributively throughout said air-shaft.

Entrance by the operator to the room 2 is made through a conventional door 43, and entrance to the main structure of the storage is made through the refrigerator type door 44. Entrance to the second story 32 of the storage may be made through the stairway 45 or by use of an ordinary freight elevator (not shown) or by any means common to building structures.

Referring to Figure 1 it will be obvious that the main side walls of the air-shaft 3 are nearer each other at the end opposite to the intake end, meaning the end through which water and air are introduced, it being understood that said air shaft is of suitable size at its intake end to allow passage of sufficient air to supply all of the tile strands, while the other end need only be of suitable size to supply the tile strand 25.

In the example shown ordinary posts serve to add support to the second floor 31 and roof 34, as will be understood by those familiar with the art, and also the ceiling of the second story 32.

The slats of the floors 4 and 31 are primarily supported by the ordinary joists 46 which are secured to the main walls of the storage structure and posts 47; and the joists 46 of said lower floor are additionally supported by means of blocks 48 which are disposed at different points under same between the troughs 26 said blocks being supported by the base floor structure 49. Said base floor structure consists preferably of the soil upon which the structure as a whole is built by which arrangement water overflowing from said troughs may be absorbed and carried away through said soil although it is understood that evaporation of the water continues after overflowing from the troughs onto same.

It is understood that the cracks in the floors 4 and 31 may be substituted for by using floors with different openings or holes therein.

The roof structure 34 and ceiling of the second story 32 are spaced apart, leaving considerable air space 50, between same. Vertical ducts 51 shown in Fig. 2 and indicated by dot-and-dash lines in Fig. 1 are provided thru said ceiling communicating the interior of the storage with said air space, by which arrangement it will be understood that air which discharges from the air ducts 33 must pass from the storage proper thru the ducts 51 and thru said air space. Now if there should be any downward movement of air thru the ducts 33 as for example in extremely windy weather, the downward moving air would not go directly into the storage proper but mingle with the air in the air space 50 and be thus tempered more to conform in temperature and humidity with the air within the storage before reaching the contents of same. The provision of said air space also serves as a pronounced double wall arrangement by which the storage proper is protected from extreme hot or cold weather, as will be understood by those familiar with the art.

While the manner of constructing the invention has been illustrated in a general way, it is evident that many modifications may be made in the various details and proportions without department from the scope of the appended claims, it being understood that the invention is not restricted to particular form or proportions herein described; and is usually constructed of any suitable size or shape which will best suit the occasion, to conform with the above described system.

The invention claimed is:

1. A storage system comprising a main building structure, means for dividing said structure into upper and lower compartments, entrance means for said compartments, an auxiliary structure adjacent one corner and exteriorly of the main structure, an air shaft interiorly of the main structure and along one wall thereof and in alignment with said auxiliary structure, means for introducing cooled water into said air shaft, means for conducting said water transversely across said main structure, and means for directing a blast of air into said air shaft and through said water conducting means.

2. A storage system comprising a main structure, an auxiliary structure exteriorly and adjacent one corner of said main structure, an ice containing compartment in said auxiliary compartment, an air shaft built within the main structure at the bottom and adjacent one wall thereof, means for directing the condensate from said ice compartment into said air shaft, a plurality of rows of tile for conveying said condensate from said air shaft over the lower part of said main structure, and means in said auxiliary structure for directing a blast of air into said air shaft and through said rows of tile.

3. A storage system comprising a main structure, an air shaft built within said structure along one wall thereof, means for introducing water into said air shaft, means cooperating with said air shaft for conveying the water laterally across the lower portion of said main structure, and troughs in which said water conveying means trend adapted to retain a quantity of said water and evenly distribute the same over the base of said main structure.

4. In a storage system, a main structure, an air shaft along one wall of said main structure and at the bottom thereof, a fan structure for directing a blast of air into said air chamber, and means for obtaining the supply of air for said fan from either the interior or exterior of said main structure or both the interior and exterior, as desired.

5. In a storage system, a main structure, an air shaft along one wall of said main structure and at the bottom thereof, troughs extending laterally from said air shaft across the lower portion of said main structure, rows of water and air conveying tiles in said troughs, and means for closing certain of the interstices at the meeting ends of said tile for regulating the distribution of the air and water passing therethrough.

6. In a storage system, a main structure, a roof structure therefor, a ceiling below said roof structure and spaced therefrom for forming an air space, ducts through said roof structure through which atmospheric air may enter said air space, ducts through said ceiling through which air may pass into the interior of said main structure, said roof ducts being out of alignment with said ceiling ducts, whereby air entering through said roof ducts will be prevented from passing directly through said ceiling ducts and be thus held in said air space a sufficient length of time to be reduced substantially to the temperature of the main structure before entering the main structure.

7. In a storage system, a main structure, an auxiliary structure exteriorly of said main structure, an air shaft along one wall of said main structure, a fan in said auxiliary structure adapted to direct air into said air shaft, a conduit extending from said fan to the exterior of said auxiliary structure, means for controlling the passage of air through said conduit, an additional duct extending from the fan duct to the upper portion of said main structure, perforate branch conduits connected therewith, and means for controlling the passage of air through said additional conduit.

8. In a storage system, a main structure, a floor in the lower portion of said main structure, an air shaft extending across said main structure adjacent one wall thereof, said air shaft being partly above and partly below said floor, and means for conveying air and water from said air shaft across the main structure below the floor therein.

9. In a storage system, a main structure, an auxiliary structure exteriorly of said main structure and separated therefrom, means for retaining a cooling medium within said auxiliary structure, an air shaft within said main structure along one wall thereof, a fan structure within said auxiliary structure adapted to direct air through said shaft, and means for introducing a cooling medium into said air shaft.

10. In a storage system, a main structure, a plurality of strands of tile in the lower portion of said main structure for conveying water and air to different parts of said structure for cooling the interior of the main structure, and means for supporting said tiles in a manner that they may be adjusted for increasing or reducing the amount of air released at any specified point in the main structure.

In testimony whereof, I have hereunto set my hand on this the 19th day of June, 1928, A. D.

JAMES BALLARD KILLION.